(12) United States Patent
Schlesener et al.

(10) Patent No.: US 7,565,448 B1
(45) Date of Patent: Jul. 21, 2009

(54) NETWORK CONTROL SYSTEM FOR A COMMUNICATION NETWORK

(75) Inventors: Matthew C. Schlesener, Olathe, KS (US); Pallavur A. Sankaranaraynan, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 869 days.

(21) Appl. No.: 10/770,782

(22) Filed: Feb. 3, 2004

(51) Int. Cl.
*G06F 15/173* (2006.01)

(52) U.S. Cl. ................................................ 709/242
(58) Field of Classification Search ................ 709/242, 709/223, 230, 238
See application file for complete search history.

(56) References Cited

U.S. PATENT DOCUMENTS

| | | | | |
|---|---|---|---|---|
| 5,577,028 A | * | 11/1996 | Chugo et al. | 370/409 |
| 5,608,726 A | * | 3/1997 | Virgile | 370/401 |
| 5,940,372 A | * | 8/1999 | Bertin et al. | 370/238 |
| 6,130,881 A | * | 10/2000 | Stiller et al. | 370/238 |
| 6,449,478 B1 | * | 9/2002 | Valentine et al. | 455/430 |
| 6,535,498 B1 | * | 3/2003 | Larsson et al. | 370/338 |
| 6,614,781 B1 | * | 9/2003 | Elliott et al. | 370/352 |
| 6,704,283 B1 | * | 3/2004 | Stiller et al. | 370/238 |
| 6,898,278 B1 | * | 5/2005 | Li et al. | 379/325 |
| 7,038,574 B1 | * | 5/2006 | Schlesener et al. | 340/286.02 |
| 7,177,295 B1 | * | 2/2007 | Sholander et al. | 370/338 |
| 7,379,981 B2 | * | 5/2008 | Elliott et al. | 709/220 |

OTHER PUBLICATIONS

Schlesener, Matthew C., Performance Evaluation of Telephony Routing over IP (TRIP), B.S.E.E. Kansas State University, Fall 1996, submitted to the Department of Electrical Engineering and Computer Science and the Faculty of the Graduate School of the University of Kansas in partial fulfillment of the requirements for the degree of Master's of Science.

* cited by examiner

*Primary Examiner*—David Y Eng

(57) ABSTRACT

An embodiment of the invention includes a network control system for a communication network comprising a first interface configured to receive an update message wherein the update message indicates a status change of a first gateway and wherein the first gateway provides an interface between a first network and a second network, and a processing system configured to update a routing table based upon the update message and a distance vector associated with the first gateway wherein the routing table comprises a Telephony Routing over Internet protocol (TRIP) routing table.

27 Claims, 8 Drawing Sheets

500

| ORIGINATING GATEWAY | DESTINATION GATEWAY | ROUTE | NUMBER OF HOPS |
|---|---|---|---|
| A | B | A-B | 1 |
| A | F | A-C-F | 2 |
| A | F | A-D-E-F | 3 |
| A | G | A-D-G | 2 |
| A | G | A-C-E-G | 3 |
| H | G | H-E-G | 2 |
| B | F | B-C-F | 2 |
| B | F | B-D-E-F | 3 |
| B | G | B-C-E-G | 3 |
| B | G | B-D-G | 2 |

| ORIGINATING GATEWAY | DESTINATION GATEWAY | ROUTE | NUMBER OF HOPS |
|---|---|---|---|
| A | B | A-B | 1 |
| A | F | A-C-F | 2 |
|  |  |  |  |
|  |  |  |  |
| A | G | A-C-E-G | 3 |
| H | G | H-G | 1 |
| B | F | B-C-F | 2 |
|  |  |  |  |
| B | G | B-C-E-G | 3 |
|  |  |  |  |

FIG. 6

NETWORK CONTROL SYSTEM FOR A COMMUNICATION NETWORK

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1) Field of the Invention

The invention is related to communication networks, and in particular, to network control systems and methods.

2. Description of the Prior Art

The advancement of the Internet has influenced the telecommunications industry to develop Internet Protocol (IP) based services. IP provides a flexible framework to support services from simple file transfer and electronic mail to more complex services like Internet-based gaming and Internet telephony. Voice-over IP (VoIP) services have been available since the inception of the Internet but have lacked quality of service (QoS) mechanisms. Network traffic and congestion cause voice quality to vary from toll grade to satellite quality or worse. As the Internet has matured, consumer demand for integrated IP service offerings has grown. This demand for integrated services has forced telecom providers to address issues such as network congestion and low QoS.

The telecommunications industry has addressed these issues by, for example, over engineering IP backbones to mitigate IP congestion and transporting IP traffic over Asynchronous Transfer Mode (ATM) networks to provide high QoS. Additional solutions developed to address these issues include implementing Telephone Routing over Internet Protocol (TRIP) and Session Initiation Protocol (SIP). TRIP is a telephony routing protocol developed to provide an IP network with next hop routing information for call requests. TRIP is designed to operate independently of signaling protocols. This allows network designers to implement TRIP in varied network environments. Session Initiation Protocol (SIP) is an underlying signaling protocol for networks utilizing TRIP.

Internet systems route communications over the Internet by packaging the communications within data packets and transporting the packets according to routing instructions contained in the packets. Routing voice communications over the Internet occurs in a similar manner. A typical internet telephony system that includes an originating telephone and a destination telephone both connected to the Internet can route packets carrying communications without leaving the Internet. However, to bridge Internet telephony calls originating on the Internet to destinations located off the Internet (such as a telephone connected to the public switched telephone network) requires media gateways to interface between the origin and the destination.

To effectively interface between Internet telephony systems and the PSTN, media gateways must be strategically located. Various systems within the Internet systems must be aware of the locations of the media gateways and the status of each individual gateway. In particular, location servers share responsibility for knowing the location and status of each gateway, and for initiating telephony sessions across the gateways utilizing the Session Initiation Protocol (SIP). SIP uses client-server interaction, with servers being divided into two types. A user runs a soft client on, for example, a SIP phone. It is assigned an identifier (e.g. SIPuser@domain.com) and can receive incoming calls. The second type of server is intermediate (i.e. sits between two SIP phones) and handles tasks such as call set up, call forwarding and call redirects. The intermediate server is called a SIP Proxy server. The location server is an entity built into the Proxy server. In a basic SIP network, the proxy server can forward an incoming call request to the next proxy server along the path to the called phone. It also can provide information back to a caller to provide destination information so that the caller can reach the destination SIP phone directly.

The location servers are running on SIP proxies Telephony Routing over Internet Protocol (TRIP) enabled. TRIP is a protocol established to effectuate messaging between location servers and gateways to keep track of the location and status of the gateways. TRIP does not run directly over IP. It must ride over a telephony protocol like SIP or H.323. IP does not provide the infrastructure (e.g. SIP proxy server and media gateway) nor the packet structure to provide what TRIP needs to do its very specific job (dynamic building of proxy server routing tables). The location server is a software entity of a SIP proxy. In a SIP only network the LS is not used—the SIP proxy will use DNS (Domain Name Service) to look up where to forward call requests. In a TRIP enabled SIP network, the location server uses update messages from media gateways and other location servers to build a dynamic routing table that the SIP proxy uses to forward and redirect call requests.

FIG. 1 illustrates media gateway system 100 in the prior art. Media gateway system 100 includes location server 110, gateway 120, and PSTN 130. Gateway 120 is in communication with TRIP enabled location server 110 by SIP messaging, and in communication with PSTN 130 by signaling system 7 (SS7) messaging or some other similar messaging protocol. In the prior art, gateway 120 is TRIP-lite enabled a SIP proxy runs TRIP enabled location server 110. When the status of gateway 120 changes, gateway 120 transmits TRIP-lite update messages to location server 110 indicating the status change. Location server 110 can then send TRIP messages to other TRIP enabled location servers to update the other location servers on the status of gateway 120. Currently, TRIP enabled systems utilize transport control protocol (TCP) for the transport of TRIP messaging.

TRIP-enabled entities running within a SIP environment utilize reliable intra-flooding update messaging mechanisms modeled after the Open Shortest Path First linked state protocol to locate optimum paths for session instantiation. However, the OSPF model lacks the ability to efficiently select IP telephony routes. Furthermore, the OSPF model lacks scalability characteristics desired for IP telephony.

SUMMARY OF THE INVENTION

An embodiment of the invention includes a network control system comprising a first interface configured to receive an update message wherein the update message indicates a status change of a first gateway and wherein the first gateway provides an interface between a first network and a second network, and a processing system configured to update a routing table based upon a distance vector associated with the first gateway wherein the routing table comprises a Telephone Routing over Internet protocol (TRIP) routing table.

In some embodiments of the invention, the first interface is configured to receive the update message from the first gateway.

In some embodiments of the invention, the first interface is configured to receive the update message from a location server.

In some embodiments of the invention, the update message comprises a Session Initiation Protocol (SIP) message.

In some embodiments of the invention, the first gateway comprises a TRIP-lite enabled gateway.

Some embodiments of the invention comprise a TRIP enabled location server application running on a Session Initiation Protocol (SIP) proxy server.

In some embodiments of the invention, the distance vector comprises a determination of the number of hops between an origination gateway of a route and a destination gateway of the route and wherein the route traverses the first gateway. In an embodiment of the invention, the first gateway comprises one of either the origination gateway or the destination gateway. In an embodiment of the invention, the first gateway is located along the route between the origination gateway and the destination gateway. In an embodiment of the invention, the first gateway provides an interface between a first asynchronous network of a first type and a second asynchronous network of a second type.

BRIEF DESCRIPTION OF THE DRAWINGS

The same reference number represents the same element on all drawings.

FIG. 5 illustrates a routing table.

FIG. 6 illustrates a routing table.

DETAILED DESCRIPTION OF THE PREFERRED EMBODIMENT

FIGS. 2-8 and the following description depict specific embodiments of the invention to teach those skilled in the art how to make and use the best mode of the invention. For the purpose of teaching inventive principles, some conventional aspects have been simplified or omitted. Those skilled in the art will appreciate variations from these embodiments that fall within the scope of the invention. Those skilled in the art will appreciate that the features described below can be combined in various ways to form multiple embodiments of the invention. As a result, the invention is not limited to the specific embodiments described below, but only by the claims and their equivalents.

First Embodiment Configuration and Operation

FIGS. 2-3

Figure 1:
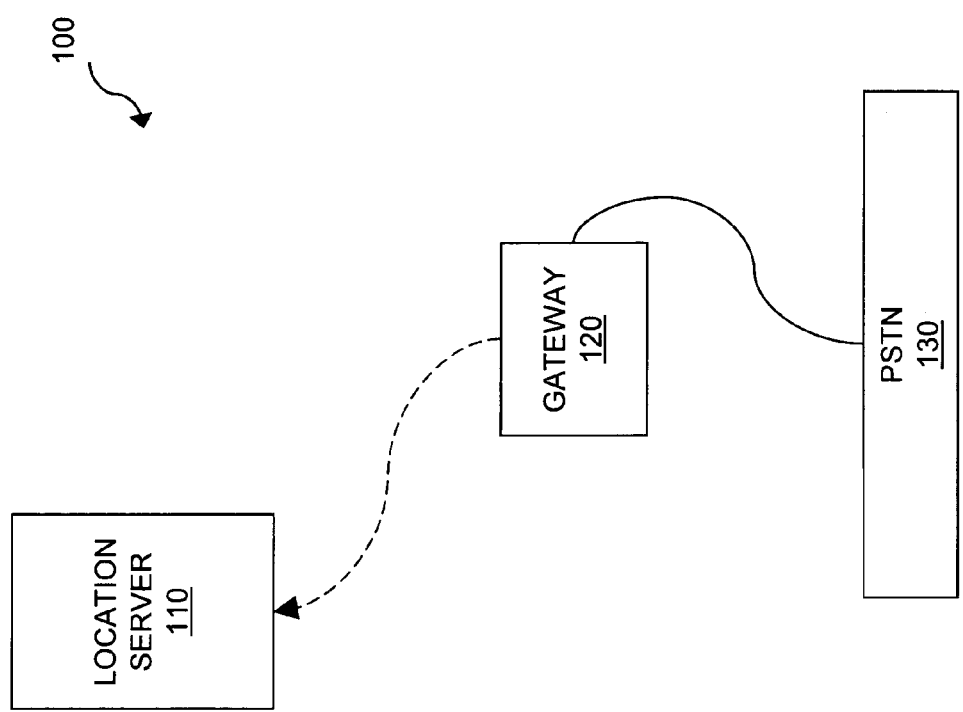
FIG. 1 illustrates a VoIP system in an example of the prior art.
Figure 2:
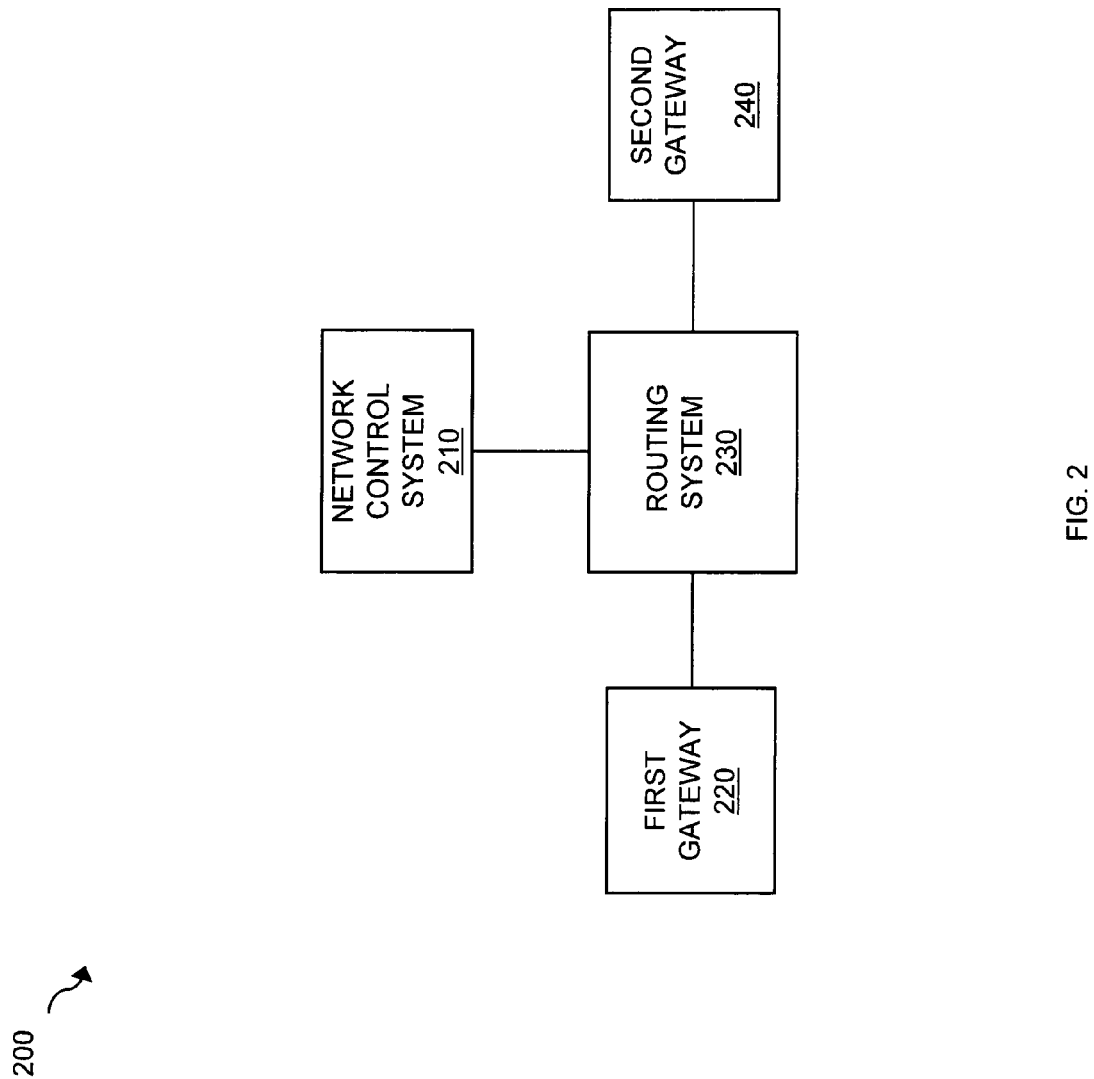
FIG. 2 illustrates a communication network in an embodiment of the invention.

FIG. 2 illustrates communication network 200 in an embodiment of the invention. Communication network 200 includes network control system 210, first gateway 220, routing system 230, and second gateway 240. Routing system 230 comprises an Internet Protocol (IP) based routing system. First gateway 220 interfaces between a network and routing system 230. Similarly, second gateway 240 interfaces between a network and routing system 230. Routing system 230 could comprise a network or system of integrated networks such as the Internet. First and second gateways 220, 240 could comprise interfaces between the Internet and portions of the Public Switched Telephone Network (PSTN). First and second gateways 220, 240 could also serve as interfaces to IP-based networks such as a local area network (LAN) or wide area network (WAN). First and second gateways 220, 230 are in communication with routing system 230 over IP-based messaging. Similarly, network control system 210 communicates with first and second gateways 220, 240 by IP-based messaging.

Figure 3:
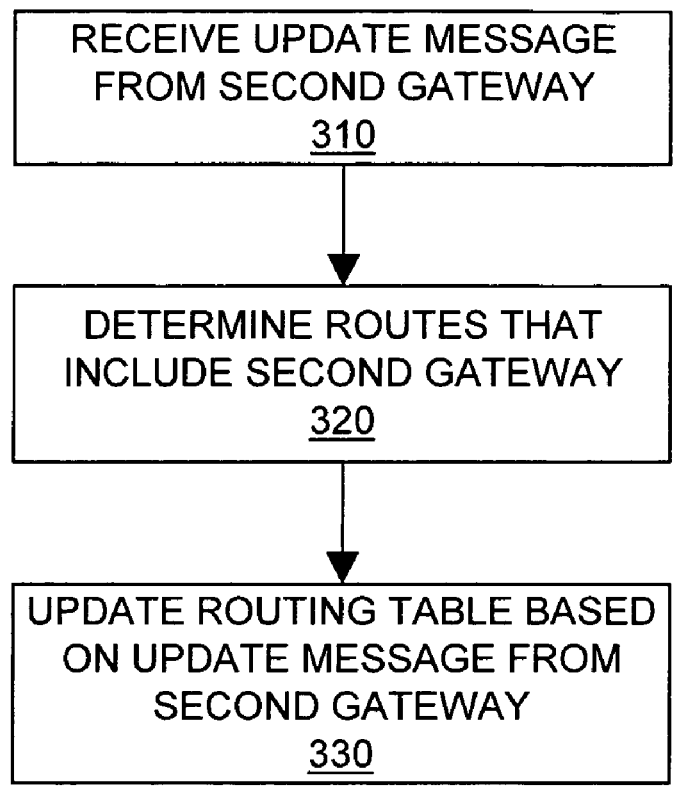
FIG. 3 illustrates the operation of a communication network in an embodiment of the invention.

FIG. 3 illustrates the operation of communication network 200 in an embodiment of the invention. Network control system 210 receives an update message (Step 310). The update message indicates a status change of second gateway 240. As mentioned, second gateway 240 provides an interface between a network such as the PSTN, a LAN or WAN, and routing system 230. Routing system 230 could comprise a conduit to a second network, or routing system 230 could comprise a second network itself such as the Internet. Network control system 210 accesses a TRIP routing table to determine what routes include second gateway 240 (Step 320). Network control system 220 then updates the TRIP routing table based on the update message received from second gateway 240 (Step 330). Network control system 220 updates the TRIP routing table based upon a distance vector associated with second gateway 240.

Second Embodiment Configuration and Operation

FIGS. 4-6

Figure 4:
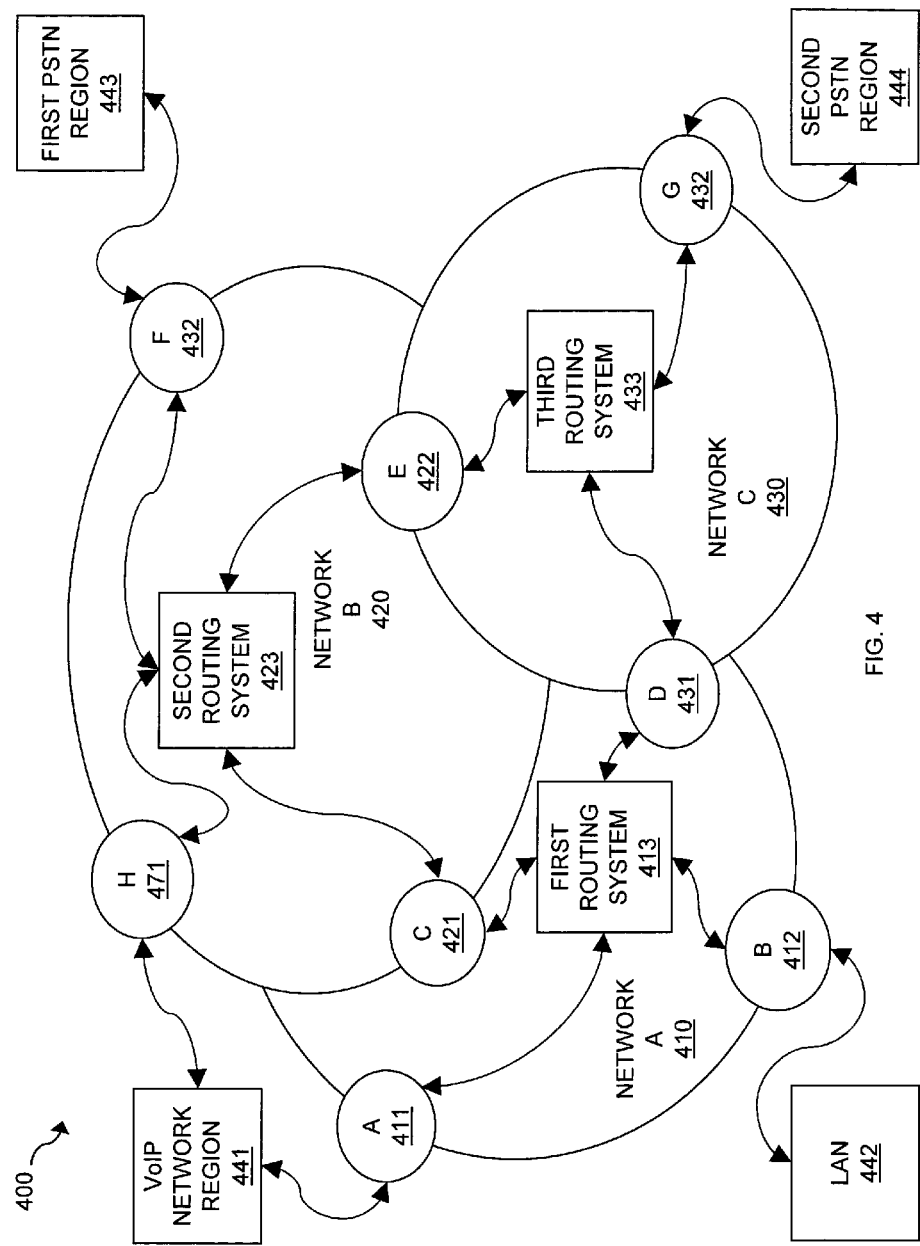
FIG. 4 illustrates a communication network in an embodiment of the invention.

FIG. 4 illustrates communication network 400 in a embodiment of the invention. Communication network 400 comprises network A 410, network B 420, network C 430, VoIP network region 441, LAN 442, first PSTN region 443, and second PSTN region 444. Network A 410, network B 420, and network C 430 represent three different networks comprised of a plurality of computing devices such as personal computers, handheld devices, routers, and other such equipment. Networks A, B, and C 410, 420, 430 together could represent an aggregate network such as the Internet. Similarly, networks A, B, and C 410, 420, 430 could comprise 3 distinct network regions such as three different IP telephony networks operated by three distinct operating companies. Similarly, networks A, B, and C 410, 420, 430 could comprise three sub-networks within a single large network.

Network A comprises first routing system 413, gateway A 411, gateway B 412, gateway C 421, and gateway D 431. Network A 410 also includes other elements not shown for purposes of clarity. Similarly, first routing system 413 could comprise could include routers, handheld devices, personal computers, and other computing devices. First routing system 413 comprises a packet based routing system such as IP or asynchronous transfer mode (ATM). Gateway A 411 interfaces between VoIP network region 441 and elements connected to gateway A 411 through first routing system 413. Gateway B 412 interfaces between LAN 442 and elements connected to gateway B 412 through first routing system 413. Gateway C 421 interfaces between elements connected to first routing system 413 and elements connected through second routing system 423 within network B 420. Network D interfaces between elements within network A 410 connected through first routing system 413 and elements within network C 430 connected through third routing system 433.

Network B comprises second routing system 423, gateway F 432, gateway E 422, gateway H 471, and gateway C 421. Second routing system 423 comprises a packet based routing system such as IP or asynchronous transfer mode (ATM). Network B 420 also includes other elements not shown for purposes of clarity. For example, network B 420 could include routers, handheld devices, personal computers, and other computing devices. Similarly, second routing system 423 could comprise one or more routers or servers, or any other type of computing device that performs routing responsibilities. Second routing system 423 comprises a packet based routing system such as IP or asynchronous transfer mode (ATM). Gateway F 4432 interfaces between first PSTN region 443 and elements connected to gateway F 432 through second routing system 423. Gateway E 422 interfaces between elements connected to third routing system 433 within network C 430 and elements connected to network B 420 through second routing system 423. Gateway H 471 interfaces between elements connected to routing system 433 and VoIP network region 441.

Network C 430 comprises third routing system 433, gateway D 431, gateway E 422, gateway H 471, and gateway G 432. Third routing system 433 comprises a packet based routing system such as IP or asynchronous transfer mode (ATM). Network C also includes other elements not shown for purposes of clarity. Gateway G 432 interfaces between second PSTN region 444 and elements connected through routing system 433.

FIG. 5 illustrates TRIP routing table 500 in an embodiment of the invention. TRIP routing table 500 stores routing distance vector information associated with communication network 400. Originating gateway column 511 holds originating gateway information. Destination gateway column 520 holds destination gateway information. Route column 530 holds routing information for routes between an originating gateway enumerated in originating gateway column 511 and a destination gateway enumerated in destination gateway 520. Distance vector column 540 holds distance vector information. In this example, the distance vector used is a number of hops between an originating gateway and a destination gateway.

Utilizing communication network 400 in this example of the invention, TRIP routing table 500 enumerates all the possible routes from VoIP network region 441 to LAN 442, first PSTN region 443, and second PSTN region 444, and all the possible routes from LAN 442 to VoIP network region 441, first PSTN region 443, and second PSTN region 444. TRIP routing table 500 also enumerates the number of hops for each route from each originating gateway to each destination gateway.

In operation, a first user utilizing a VoIP enabled phone places a call from VoIP network region 441 to a second user utilizing a phone connected to second PSTN region 444. Upon the first user initiating the call, a network control system receives a call setup message for the call. The network control system processes the call setup message to determine a route from VoIP network region 441 to second PSTN region 444. The network control system selects the route based several factors including the status of each gateway along the possible routes. Three possible routes connect the first user to the second user: route 1 from gateway A 411 to gateway D 431 to gateway G 243, route 2 from gateway A 411 to gateway C 421 to gateway E 422 to gateway G 432, and route 3 from gateway H 471 to gateway E 422 to gateway G 432. Distance vector column 540 indicates that route 1 includes 2 hops, route 2 includes 3 hops, and route 3 includes 2 hops. In this example, the network control system selects routes 1 or 3 to connect the call because routes 1 and 3 require 2 hops as compared to 3 hops for route 2.

Next, gateway D 431 transmits an update message to the network control system. The update message indicates a status change for gateway D 431 instructing the network control system that gateway D 431 has become inoperable. Network control system access TRIP routing table 500 to update all the routes containing gateway D 431 along the routes. FIG. 6 illustrates TRIP routing table 600. TRIP routing table 600 comprises an updated version of TRIP routing table 500 having eliminated routes containing gateway D 431. The network control system selects a new route for the call from VoIP network region 441 to second PSTN region based upon a distance vector approach. First, the network control system determines from the updated TRIP routing table 600 that only route 2 and route 3 remain intact after gateway D 431 became inoperable. Based upon the distance vector approach, the network control system selects route 3 to connect the call because route 3 contains 2 hops as compared to the 3 hops of route 2.

Third Embodiment Configuration and Operation

FIG. 7

VoIP transmits voice packets over IP networks. VoIP service can be offered over any data network that supports IP traffic, for example the Internet, enterprise IP networks, and Local Area Networks (LANs). The voice signal is digitized, compressed, and converted to IP packets and then transmitted over the IP network. Signaling protocols are used to setup and tear down calls and carry information required to locate users and negotiate capabilities. Internet telephony provides low cost services for multimedia communication and the integration of voice and data networks.

For VoIP to become popular, some key issues need to be resolved. Some of these issues stem from the fact that IP was designed for transporting data while some issues have arisen from vendors not conforming to standards. IP was designed to carry data so it des not provide real-time guarantees but only provides best effort services. For VoIP to become acceptable to the users, QoS functionality must be introduced. Products from different vendors need to interoperate with each other if VoIP is to become common among users. Public Switched Telephone Network (PSTNs) and IP telephony networks must be interoperable and appear as a single network.

Figure 7:
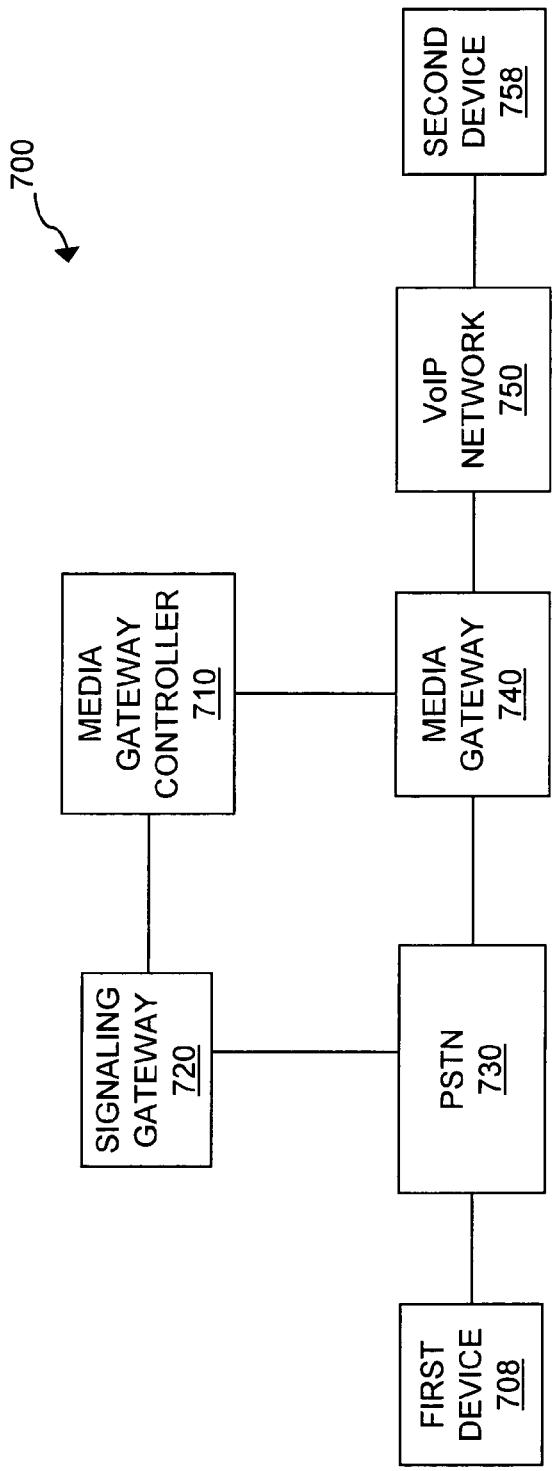
FIG. 7 illustrates a communication network in an embodiment of the invention.

FIG. 7 illustrates communication network 700 in an embodiment of the invention. Communication network 700 comprises first device 708, PSTN 730, signaling gateway (SG) 720, media gateway controller (MGC) 720, media gateway (MG) 740, VoIP network 750, and second device 758. MG 740 terminates media streams from PSTN 730 (e.g. switched voice). MG 740 encapsulates the media streams into packets and delivers the packetized voice traffic to VoIP network 750. VoIP network 750 subsequently routes and forwards the traffic to an appropriate host such as second device 758.

SG 720 is a signaling agent at the edge of VoIP network 750 that receives and transmits SS7 into PSTN 730. SG 720 relays, translates, and terminates the SS7 traffic it receives. SG 720 encapsulates the SS7 signaling into packets and transmits the packetized signaling into VoIP network 750 using Signaling Transport protocol. The packetized signaling would generally be destined for MGC 710. In many cases, a single physical device provides both MG 740 and SG 720 functionality and a PRI-ISDN line is used as the connection to PSTN 730.

MGC 710 registers and manages the resources of MG 740 (e.g., trunks). MGC 710 makes session routing decisions based on local policy. As stated before, MGC 710 is generally the destination of the packetized signaling from SG 720. MGC 710 de-encapsulates the packetized signaling and makes call routing decisions. MGC 710 makes call routing decisions based on a distance vector approach. MGC 710 is configured with IP address to E-164 phone address pairs which allows mapping between the two networks. It locates the destination address (IP or phone number) from the SS7 signaling unit (could be ISDN or Q.931) and signals the IP address of the destination host to MG 740. MG 740 then sets up the bearer path from the host in PSTN 730 to the host in VoIP network 750 and interworks communications between PSTN 730 and VoIP network 750.

Communication network 700 utilizes SIP for SIP initiating, managing, and terminating network sessions. SIP is a text-based protocol that resides at the session layer of the OSI model. SIP provides advanced signaling and control to an IP network. SIP supports varied multimedia applications. SIP is designed to efficiently and scalable find network resources based on location-independent name or address and subsequently negotiate session parameters. Along with providing Internet based telephony, SIP is capable of supporting many new services like instant messaging, Internet gaming, and many more.

The principal role of SIP is to establish sessions between two or more inter-network end systems such as first device 708 and second device 758 in communication network 700. The session is then utilized by the end systems to exchange media data driven by the particular application. In general practice, at least one of the end systems will be part of an IP domain. In this embodiment, second device 758 is part of VoIP network 750 which is an IP domain. In a SIP network, requests are routed using the Uniform Resource Identifier (URI). SIP requests URIs look similar to an email address. They include a user and host part as well as a number of parameters. In practice, an end user could use their personal email address as their SIP URI.

In a SIP network, all reachable routes must be manually provisioned in proxies and gateways. In a medium to large-scale implementations, the manual provisioning of the same routing information twice (proxies and gateways) is costly and prohibitive. Additionally, proxies have no knowledge of gateway dynamic states. The lack of dynamic resource information causes added call blocking to SIP networks. In a TRIP-enabled network, TRIP-lite solves these issues. TRIP-lite is an added client application implemented on TRIP-lite enabled gateways. TRIP-lite is responsible for updating proxies with reachable routes and dynamic resource information.

Within a SIP network, four logical entities exist: user agents, registrars, proxy servers, and redirect servers. User agents are the end users of the SIP network and initiate requests and are the destination of services initiated by other users (e.g, the called party on a videoconference). IP telephones and PC soft phones (application software running on a PC that emulates telephone services) are examples of user agents. Second device 758 could comprise an IP telephone, PC soft phone, or other similar equipment. The registrars are responsible for keeping track of user agents assigned to their network domain. The proxy servers forward SIP requests and responses. The redirect servers take SIP requests and return location information to another user agent or server. In many cases the registrar, proxy, and redirect servers are all implemented in the same device such as MGC 710.

Once a SIP request is forwarded into a SIP network, the proxy and redirect servers will take action based on the URI. If the proxy or redirect servers take action based upon a lookup to a routing table, the URI is rewritten to reflect the new routing information provided by the proxy or redirect server. An example of this process would be if a user placed a forward on his/her SIP phone. Any call request for that SIP phone forwarded to the associated proxy server would rewrite the request URI redirecting the call request to the newly specified destination device.

SIP messaging can be transported on a variety of transport mechanisms. The standard implementation would be transport across connectionless User Defined Protocol (UDP). In general this implementation is preferred to circumvent the session setup and tear down overhead incurred with the connection oriented Transport Control Protocol (TCP). Since UDP is generally used the SUP protocol is not supported by any reliable transport mechanisms. To insure delivery the SUP protocol simply compels the send host to continually send the specific SIP message until it receives an acknowledgement.

SIP messaging is text based an in general very simple to follow. An invite (INVITE) command is the initial message sent by the call originator. It in essence is inviting the called party to enter the session. The invite will be sent form the originating user agent to a proxy or redirect server. The proxy will subsequently forward the invite request based on its routing table. The destination user agent will send an acknowledgement (ACK) to accept and begin media exchange. Either user agent will tender the bye (BYE) command to terminate the call.

SIP utilizes Session Description Protocol (SDP) to support multimedia sessions. SDP allows each user agent to declare the type of media streams it wishes to accept and send. Like SIP, SDP is a simple textual format. A typical SDP message is carried in the SIP message body. Each media stream includes the destination address and port number and a list of received supported encoding schemes.

In a SIP network, MG 740 has trunks that support a specific destination phone prefix (913-xxx-xxxx). That prefix and trunk group information are configured in MG 740. MG 740 then routes all calls through that trunk group to that prefix destination. The same prefix information will be configured in the proxy also. The proxy in MGC 710 uses this information when it receives a call request from either VoIP network 750 or PSTN 730. The proxy conducts a look-up at its routing table and determines which gateways have a trunk to the specified destination prefix. Numerous gateways interface between VoIP network 750 and different regions of PSTN 730, although only MG 740 is shown for purposes of clarity. Next, the proxy determines which gateway will result in a routing configuration with the least amount of hops. The proxy will select the gateway that results in a route for the call having the least amount of hops. The proxy will signal the gateway of the incoming call request and also signal the call originator with the IP address of the selected gateway. The gateway will then act as the conduit between the SIP VoIP network and the PSTN. In this case, the proxy selects MG 740.

A SIP network also includes a logical entity called a location server. The location server (LS) is responsible for locating the next-hop for an incoming session request. The location server co-resides with the proxy and redirect services in MGC 710. For a basic SIP network, the LS will use location mappings installed though user agent registration. Each user agent must periodically register its current network address with a SIP registrar service. The registering process allows the LS to know all user agents and associated addresses within its local domain. If the user agent destination is outside the local domain, a DNS look-up is done to locate the next hop information. The use of DNS is a slow process and part of the impetus to define a dynamic routing protocol for routing call requests within a SIP network.

The function of the LS is to provide next-hop routing information for incoming session requests. TRIP runs in conjunction with a SIP/IP network. The task of TRIP is to build a routing table for the proxy it supports. The proxy will utilize that routing table to make session request forwarding decisions. SIP uses DNS queries to route SIP requests. Implementing a distance vector approach with TRIP improves SIP implementation of next hop routing information. Each TRIP-enabled proxy updates a routing table based on distance vectors and is able to locate the optimum path for session initiation.

All TRIP communications are sent across reliable transport (generally TCP). This eliminates the need to implement explicit fragmentation, retransmission, acknowledgment, and sequencing in TRIP. The error notification mechanism used in TRIP assumes that the transport protocol supports a graceful close. TRIP is independent of the underlying VoIP signaling protocol. For example, TRIP can be implemented on a H.323 network as well as a SIP network. H.323 is an ITU standard that provides a foundation for audio, video, and data communications. H.323 defines a unified system for providing multimedia applications.

The physical architecture of a TRIP network is identical to a SIP network. The difference between the two is a TRIP-enabled SIP network includes added clients and applications running on the physical SIP devices/entities. The major entities in a TRIP network are the proxy running a TRIP-enabled location server and the media gateway running a TRIP-lite client. A TRIP-enabled location server is referred to as a TRIP speaker because it messages other entities with TRIP messaging. The location server functionality can be further segregated into a border TRIP speaker and a TRIP speaker internal to an administrative domain.

The TRIP-lite (also called TRIP-GW) client runs on the media gateway. The TRIP-lite client is responsible for advertisement of routes and PSTN prefix destinations reachable through its PSTN trunks. TRIP-lite advertises these routes and prefix destinations to at least one, location server. If proxy redundancy is built into the TRIP/SIP network, the TRIP-lite client will advertise the routes and prefix destinations to two or more location servers. Thus, multiple proxy servers would be able to route calls to that single gateway. This eliminates the possibility that a failed proxy server will also remove from service all the gateways it supports. A normal implementation would have each gateway advertise its routes and prefix destinations to a primary location server and a secondary location server. Since TRIP-lite automatically advertises reachable routes to the location server, no manual configuration is required on the proxy. This resolves the proxy manual configuration drawback of a SIP network.

The TRIP-lite client continually updates the location server with dynamic resource information. The types of attributes messaged are destination prefixes, capacity to each prefix destination, dynamic utilization of each trunk group and other statistics usable by the location server to determine the optimum gateway for the next call request. If a specific location server has two gateways, each with a trunk group to one destination prefix, the LS can use the dynamic resource information to load balance across the two gateways. The TRIP-lite dynamic resource messaging resolves the issue of a proxy not having real-time resource knowledge of the SIP network.

The functionality provided a location server by TRIP can be divided into two distinct parts. They are TRIP routing within an administrative domain (I-TRIP) and TRIP routing between domains (E-TRIP). Referring to FIG. 4, network A 410, network B 420, and network C 430 could be examples of different domains. A TRIP administrative domain is referred to as an IP Telephony Administrative Domain (ITAD). The function of I-TRIP is an inter-ITAD gateway location and routing protocol. The primary function of a location server running TRIP, referred to as a TRIP speaker, is to exchange route table information with other location servers. This information includes the reachability of telephony destinations, the routes towards these destinations, and information about gateways towards those telephony destinations residing in the PSTN. The I-TRIP database update messaging is flooded via reliable intra-flooding mechanism modeled after that of the Open Shortest Path First (OSPF). The flooding is made reliable by the transport protocol on which TRIP is supported.

A peer transport connection is established between two location servers. They exchange messages to open and confirm the connection parameters, and to negotiate the capabilities of each LS as well as the type of information to be advertised over this connection. Keep-alive messages are transmitted throughout the life of the connection. After initial peer connection setup, the two location servers will exchange their full routing tables. For I-TRIP this includes both internal and external route table information. After the initial table exchange the two peers will only send updates. Theses updates are flooded throughout the ITAD. Once all location servers have received all updates, the internal routing tables (called LOC-TRIB) for all location servers should converge to be identical. This convergence is referred to as synchronization.

When a location server receives an update message, the routes in the update are checked to determine if they are newer than the version already in the database. If newer, the LS will update its route table based on a distance vector approach and then flood that update to all other peers in the same domain. As stated, when all peers in the domain have received that flooded update and made the route table update, the system is synchronized. TRIP routes are advertised between a pair of location servers in UPDATE messages. The destination addresses and other attributes such as path or egress gateway are included in the message.

TRIP allows the SIP network to reroute calls to other proxy servers based on dynamic information. For example, if a gateway is at full utilization of a specific trunk group the TRIP-lite client would message the LS with that dynamic resource information. If that proxy then receives a call request for that destination truck the proxy would know it must send the call request elsewhere for termination. It would then look at its route table and identify possible second proxies with a gateway trunk to the specified destination. The proxy would then compare distance vectors (such as hop count) to determine which gateway is the best gateway for connecting to the destination. The primary LS would subsequently reroute the call request to the selected secondary proxy for termination through its gateway.

TRIP also was developed to exchange telephony routing information between administrative domains. This functionality is referred to as E-TRIP. As discussed earlier, I-TRIP uses reliable flooding to synchronize the routing tables of all TRIP speakers in an ITAD. E-TRIP was developed to function like Border Gateway Protocol Version 4 (BGP-4). TRIP designers actually built the protocol using BGP's inter-domain transport mechanism, BGP's peer communication, BGP's finite state machine, and similar formats and attributes as BGP. E-TRIP peers establish point-to-point links and provide route updates based only on the external routing table (Ext-TRIB). Specific internal routing information is not updated beyond the boundary of the ITAD.

The remainder of E-TRIP functionality is identical to I-TRIP. This includes routs being transmitted in SIP UPDATE messages and the attributes advertised. I-TRIP and E-TRIP provide a dynamic telephony routing protocol. A synchronized TRIP-enabled SIP network utilizing a distance vector approach provides for optimum next hop route decisions.

Figure 8:
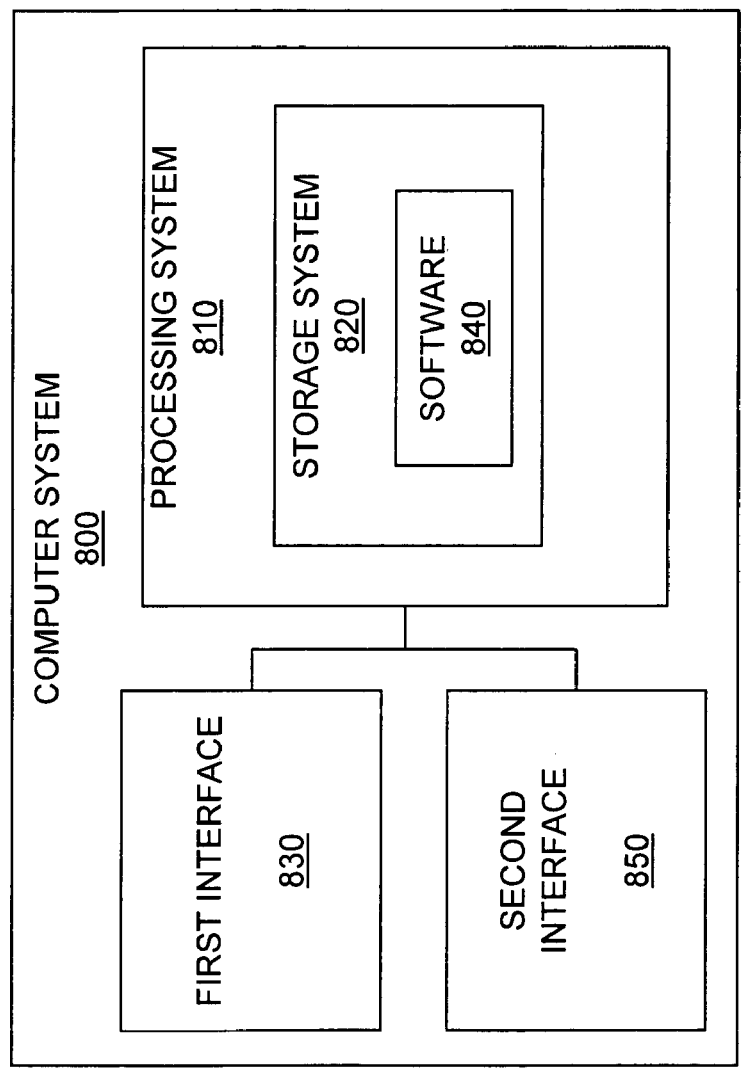
FIG. 8 illustrates a computer system in an embodiment of the invention.

Computer System Configuration—FIG. 8

FIG. 8 illustrates computer system 800 that could be used to implement aspects of the invention. In particular, computer system 800 could be used in communication network 200, 400, or 700 and in other similar communication networks. Computer, system 800 includes processing system 810, storage system 820, software 840, first interface 830, and second interface 850. Storage system 820 stores software 840. Processing system 810 is linked to first interface 830 and second interface 850. Computer system 800 could be comprised of programmed general-purpose computers, although those skilled in the art will appreciate that programmable or special purpose circuitry and equipment may be used. Computer system 800 may use a client server architecture where operations are distributed among a server system and client devices that together comprise elements 810-850.

First interface 830 could comprise a network interface card, modem, port, or some other communication device. First interface 830 may be distributed among multiple communication devices. Processing system 810 could comprise a computer microprocessor, logic circuit, or some other processing device. Processing system 810 may be distributed among multiple processing devices. Second interface 850 could comprise a keyboard, mouse, voice recognition interface, microphone and speakers, graphical display, touch screen, or some other type of user device. Storage system 820 could comprise a disk, tape, integrated circuit, server, or some other memory device. Storage system 820 may be distributed among multiple memory devices.

Processing system 810 retrieves and executes software 840 from storage system 820. Software 840 may comprise an operating system, utilities, drivers, networking software, and other software typically loaded onto a general-purpose computer. Software 840 could also comprise an application program, firmware, or some other form of machine-readable processing instructions. When executed by the processing system 810, software 840 directs the processing system 810 to operate as described for communication networks 200, 400, and 700.

What is claimed is:

1. A network control system comprising:
 a first interface configured to receive an update message, wherein the update message indicates a status change of a first gateway of a plurality of gateways, and wherein the plurality of gateways provide an interface between a synchronous network and an asynchronous network, and receive a call request for a call from the asynchronous network to a destination in the synchronous network; and
 a processing system configured to update a routing table based upon the status change indicated in the update message, wherein the routing table indicates a status of each of the plurality of gateways and a distance vector associated with each of the plurality of gateways, and process the updated routing table to select a one of the plurality of gateways through which to route the call based on the status of each of the plurality of gateways and the distance vector associated with each of the plurality of gateways, wherein the routing table comprises a Telephony Routing over Internet Protocol (TRIP) routing table.

2. The network control system of claim 1 wherein the first interface is configured to receive the update message from the first gateway.

3. The network control system of claim 1 wherein the first interface is configured to receive the update message from a location server.

4. The network control system of claim 1 wherein the update message comprises a Session Initiation Protocol (SIP) message.

5. The network control system of claim 1 wherein the first gateway comprises a TRIP-lite enabled gateway.

6. The network control system of claim 1 comprising a TRIP enabled location server application running on a Session Initiation Protocol (SIP) proxy server.

7. The network control system of claim 1 wherein the distance vector comprises a determination of the number of hops between an origination gateway of a route and a destination gateway of the route and wherein the route traverses the first gateway.

8. The network control system of claim 7 wherein the first gateway comprises one of either the origination gateway or the destination gateway.

9. The network control system of claim 7 wherein the first gateway is located along the route between the origination gateway and the destination gateway.

10. A communications network comprising:
 a plurality of gateways configured to interface communications between a synchronous network and an asynchronous network;
 a first gateway of the plurality of gateways configured to transmit an update message wherein the update message indicates a status change of the first gateway wherein the first gateway provides an interface between the synchronous network and the asynchronous network, and receive a call request for a call from the asynchronous network to a destination in the synchronous network;
 a network control system configured to receive the update message and to update a first routing table based upon the status change indicated in the update message, wherein the routing table indicates a status of each of the plurality of gateways and a distance vector associated with each of the plurality of gateways, and process the updated routing table to select a one of the plurality of gateways through which to route the call based on the status of each of the plurality of gateways and the distance vector associated with each of the plurality of gateways wherein the first routing table comprises a Telephony Routing over Internet Protocol (TRIP) routing table.

11. The communications network of claim 10 wherein the network control system is configured to receive the update message from the first gateway.

12. The communications network of claim 10 further comprising a location server configured to receive the update message from the first gateway and transmit the update message to the network control system.

13. The communications network of claim 10 wherein the update message comprises a Session Initiation Protocol (SIP) message.

14. The communications network of claim 10 wherein the first gateway comprises a TRIP-lite enabled gateway.

15. The communications network of claim 10 wherein the network control system comprises a TRIP enabled location server application running on a Session Initiation Protocol (SIP) proxy server.

16. The communications network of claim 10 wherein the distance vector comprises a determination of the number of hops between an origination gateway of a route and a destination gateway of the route and wherein the route traverses the first gateway.

17. The communications network of claim 16 wherein the first gateway comprises one of either the origination gateway or the destination gateway.

18. The communications network of claim 16 wherein the first gateway is located along the route between the origination gateway and the destination gateway.

19. A method of operating a network control system comprising:
in a first interface, receiving an update message wherein the update message indicates a status change of a first gateway of a plurality of gateways, and wherein the plurality of gateways provide an interface between a synchronous network and an asynchronous network, and receive a call request for a call from the asynchronous network to a destination in the synchronous network; and
in a processing system, updating a routing table based upon the status change indicated in the update message, wherein the routing table indicates the status of each of the plurality of gateways and a distance vector associated with each of the plurality of gateways, and processing the updated routing table to select a one of the plurality of gateways through which to route the call based on the status of each of the plurality of gateways and the distance vector associated with each of the plurality of gateways, wherein the routing table comprises a Telephony Routing over Internet Protocol (TRIP) routing table.

20. The method of claim 19 wherein the first interface receives the update message from the first gateway.

21. The method of claim 19 wherein the first interface receives the update message from a location server.

22. The method of claim 19 wherein the update message comprises a Session Initiation Protocol (SIP) message.

23. The method of claim 19 wherein the first gateway comprises a TRIP-lite enabled gateway.

24. The method of claim 19 network control system comprises TRIP enabled location server application running on a Session Initiation Protocol (SIP) proxy server.

25. The method of claim 19 wherein the distance vector comprises a determination of the number of hops between an origination gateway of a route and a destination gateway of the route and wherein the route traverses the first gateway.

26. The method of claim 25 wherein the first gateway comprises one of either the origination gateway or the destination gateway.

27. The method of claim 25 wherein the first gateway is located along the route between the origination gateway and the destination gateway.

* * * * *